United States Patent
Angamuthu et al.

(10) Patent No.: US 11,271,872 B2
(45) Date of Patent: Mar. 8, 2022

(54) AGGREGATED NETWORKING DEVICE POLICY BASED ROUTING SYSTEM

(71) Applicant: Dell Products L.P., Round Rock, TX (US)

(72) Inventors: Dhanapal Angamuthu, Chennai (IN); Senthil Nathan Muthukaruppan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 126 days.

(21) Appl. No.: 16/809,853

(22) Filed: Mar. 5, 2020

(65) Prior Publication Data
US 2021/0281526 A1 Sep. 9, 2021

(51) Int. Cl.
| | |
|---|---|
| *H04L 12/935* | (2013.01) |
| *H04L 12/709* | (2013.01) |
| *H04L 12/801* | (2013.01) |
| *H04L 12/813* | (2013.01) |
| *H04L 12/741* | (2013.01) |
| *H04L 49/00* | (2022.01) |
| *H04L 45/24* | (2022.01) |
| *H04L 47/10* | (2022.01) |
| *H04L 47/20* | (2022.01) |
| *H04L 45/00* | (2022.01) |

(52) U.S. Cl.
CPC ........ *H04L 49/3009* (2013.01); *H04L 45/245* (2013.01); *H04L 45/54* (2013.01); *H04L 47/10* (2013.01); *H04L 47/20* (2013.01)

(58) Field of Classification Search
None
See application file for complete search history.

(56) References Cited

U.S. PATENT DOCUMENTS

| | | | | |
|---|---|---|---|---|
| 2014/0204761 | A1* | 7/2014 | Durrani | H04L 47/125 370/236 |
| 2014/0254352 | A1* | 9/2014 | Natarajan | H04L 45/245 370/228 |
| 2016/0301597 | A1* | 10/2016 | Jayakumar | H04L 45/245 |
| 2017/0063668 | A1* | 3/2017 | Sivasankar | H04L 45/18 |
| 2018/0019938 | A1* | 1/2018 | Muthukaruppan | H04L 45/12 |
| 2018/0343197 | A1* | 11/2018 | Obulisami | H04L 61/2038 |

OTHER PUBLICATIONS

Dell. Using Policy Based Routing and Access Control Lists in a Virtualized Network. v1.1 (Year: 2015).*

* cited by examiner

*Primary Examiner* — Andre Tacdiran
(74) *Attorney, Agent, or Firm* — Joseph Mencher

(57) ABSTRACT

An aggregated switch PBR system includes aggregated switches coupled together by an ICL and to a first core switch by a first LAG. A first aggregated switch includes a first link in the first LAG, and a second link to a second core switch. The first aggregated switch provides a first PBR entry in its PBR table that redirects packets initially provided for forwarding via the second link to the second core switch such that those packets are forwarded via the first link to the first core switch. When the first link becomes unavailable, the first aggregated switch provides a second PBR entry in its PBR table that redirects the packets initially provided for forwarding via the second link to the second core switch such that those packets are forwarded via the ICL to the second aggregated switch for transmission via the first LAG to the first core switch.

20 Claims, 13 Drawing Sheets

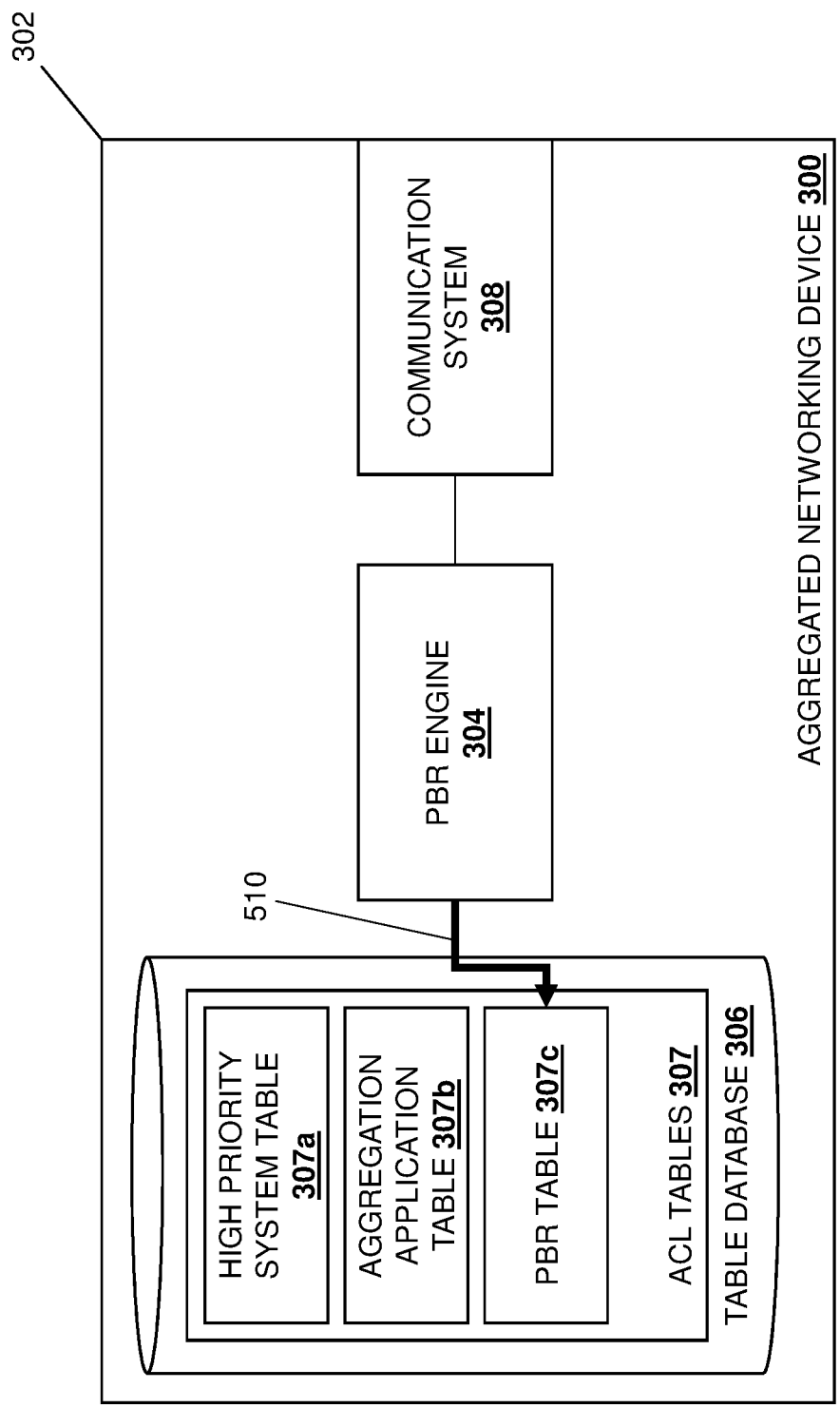

AGGREGATED NETWORKING DEVICE POLICY BASED ROUTING SYSTEM

BACKGROUND

The present disclosure relates generally to information handling systems, and more particularly to providing policy-based routing in aggregated information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, are sometimes aggregated together in order to, for example, provide a single logical networking device that includes the capabilities of the aggregated physical networking devices. For example, Virtual Link Trunking (VLT) switch devices utilize the VLT protocol (a proprietary aggregation protocol provided in switch devices available from DELL® Inc. of Round Rock, Tex., United States) in order to provide a redundant, load-balancing connection to a core network in a loop-free environment while eliminating the need to utilize the Spanning Tree Protocol. In one specific VLT configuration, a pair of VLT switch devices (also called "VLT peer devices") may be connected together by one or more links that provide an Inter-Chassis Link (ICL) (also referred to as a VLT interconnect (VLTi)) in order to provide a VLT domain, with a Top Of Rack (TOR) switch device connected to each of the pair of VLT peer devices via respective links provided in a Link Aggregation Group (LAG) (also called a "VLT port channel"), and a core switch device connected to each of the pair of VLT peer devices via respective links provided in a LAG (also called a "VLT port channel"). In operation, the TOR switch device may be coupled to a first host device, the core switch device may be coupled to a second host device via a network, with the TOR switch device, VLT peer devices, and core switch device utilizing the VLT port channels between them to transmit packets between the first host device and the second host device.

However, in some configurations, a second core switch device that is coupled to the second host device via the network may also be coupled to a first VLT peer device (e.g., in addition to a first core switch device that is coupled to each of the first VLT peer device and the second VLT peer device via the VLT port channel as discussed above.) In such a configuration, conventional Layer 3 (L3) routing techniques may provide for the routing of packets received by the first VLT peer device from the first host device (via the TOR switch device) to the second core switch device to reach the second host device, rather than to the first core switch device via the VLT port channel in order to reach the second host device. In such situations, it is desirable to change the conventional L3 routing behavior discussed above in order to take advantage of the benefits provided by the VLT domain by providing for the routing of packets received by the first VLT peer device from the first host device over the VLT port channel to the first core switch device in order to reach the second host device.

Policy-Based-Routing (PBR) is a technique that is used to make routing decisions based on policies set by a network administrator, and may be utilized to override the conventional L3 routing behavior caused by the conventional L3 routing techniques discussed above. For example, the conventional L3 routing behavior discussed above may result from the conventional L3 routing techniques that identify the destination of the packet (e.g., the second host device) and, in response, select a first egress port on the first VLT peer device that is connected to the second core switch device for forwarding that packet. In order to override that conventional L3 routing behavior, a PBR entry in a PBR table in the first VLT peer device may be provided that identifies packets selected for forwarding over the first egress port on the first VLT peer device to the second host device, and redirects those packets such that they are forwarded over a second egress port on the first VLT peer device that is connected to the first core switch device, thus transmitting packets that conventional L3 routing techniques would forward via the second core switch device to the second host device via the VLT port channel and the first core switch device to the second host device. However, the use of PBR techniques with aggregated networking devices such as the VLT peer devices discussed above can raise some issues.

For example, in some situation, egress ports on the VLT peer devices may become unavailable, thus making their corresponding link in the VLT port channel to the core switch device unavailable. To address such unavailable egress port/link situations, VLT peer devices also include VLT application tables that may include VLT application entries that provide for the forwarding of packets directed to an unavailable egress port over the VLTi to the other VLT peer device, which allows that other VLT peer device to utilize its available link in the VLT port channel to forward that packet to the core switch device such that it may be provided to the second host device. Thus, continuing with the example above, in the event a packet is directed to the second egress port on the first VLT peer device that provides a link to the VLT port channel connected to the first core switch device, and that second egress port become unavailable, a VLT application entry may provide for the forwarding of that packet over the VLTI to the second VLT peer device so that packet may be forwarded via the VLT port channel and the first core switch device to the second host device. However, when the PBR techniques described above operate to direct packets to an egress port on a VLT peer device that provides a link in the VLT port channel to a core switch device, and then that egress port becomes unavailable, issues can arise. For example, the chipset architecture in the processing system of the VLT peer device may provide for the accessing of the VLT application table lookup and the PBR table lookup at substantially the same time, and can result in packets being dropped.

Returning to the example provided above, as discussed above the conventional L3 routing techniques will cause the first VLT peer device to select a first egress port on the first VLT peer device that is connected to the second core switch device for forwarding packets transmitted by the first host device to the second host device, and a PBR entry may provide for the redirection of those packets from the first egress port to a second egress port that is connected via the VLT port channel to the first core switch device. In the event the second egress port become unavailable, when the VLT application table lookup is performed, the egress interface for that packet will be identified as the first egress port connected to the second core switch device (rather than the second egress port that is connected via the VLT port channel to the first core switch device and the unavailability of which triggers the VLT application entry), and thus the VLT application entry that would forward that packet over the VLTi is not utilized. Furthermore, when the PBR table lookup is performed, the egress interface for that packet will be identified as the first egress port connected to the second core switch device, and the PBR entry will be utilized to redirect that packet to the second egress port that is unavailable, causing that packet to be dropped.

Accordingly, it would be desirable to provide an aggregated networking device policy-based routing system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Policy Based Routing (PBR) engine that is configured to: provide a first Policy Based Routing (PBR) entry in a PBR table that redirects packets that are initially provided for forwarding via a first port that provides a first link to a first core networking device such that those packets are forwarded via a second port that provides a second link that is included in a first Link Aggregation Group (LAG) to a second core networking device; detect that the second port is unavailable; and provide, in response to detecting that the second port is unavailable, a second PBR entry in the PBR table that redirects the packets that are initially provided for forwarding via the first port that provides the first link to the first core networking device such that those packets are forwarded via an Inter-Chassis Link (ICL) to an aggregated networking device for transmission via the first LAG to the second core networking device.

BRIEF DESCRIPTION OF THE DRAWINGS

FIG. 5E is a schematic view illustrating an embodiment of the aggregated networking device of FIG. 3 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
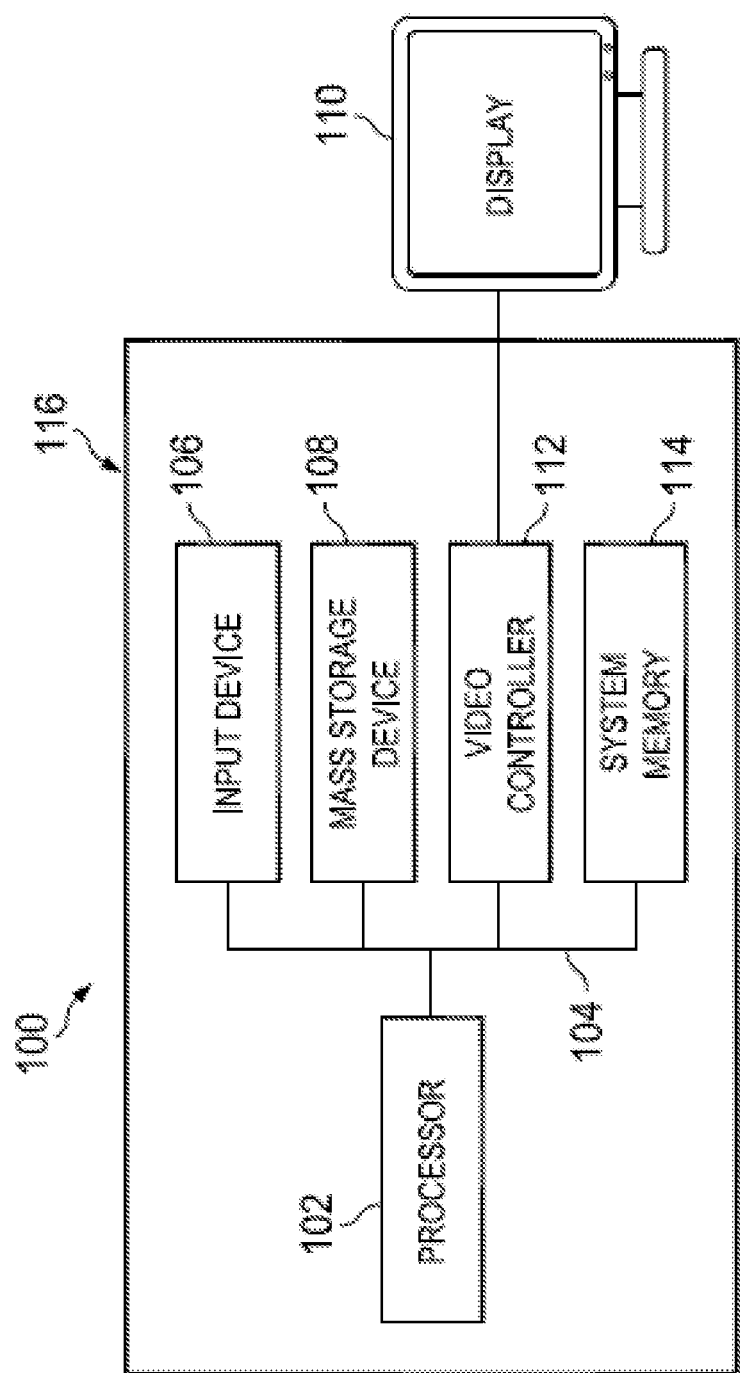
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
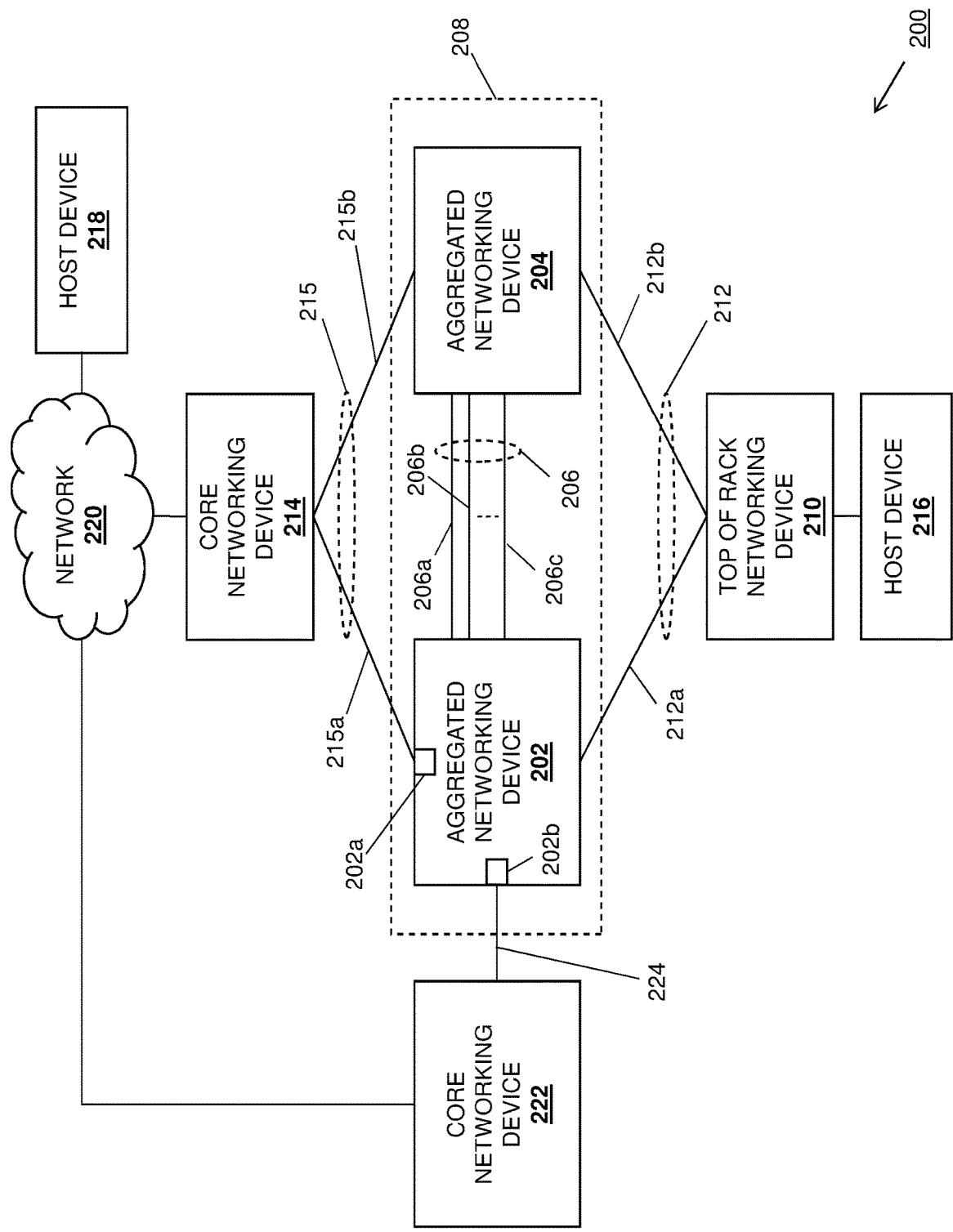
FIG. 2 is a schematic view illustrating an embodiment of an aggregated networking device policy-based routing system.

Referring now to FIG. 2, an embodiment of an aggregated networking device policy-based routing system 200 is illustrated. In the illustrated embodiment, the aggregated networking device policy-based routing system 200 includes a pair of aggregated networking devices 202 and 204. In an embodiment, either or both of the aggregated networking devices 202 and 204 may be provided by the IHS 100 discussed above with reference to FIG. 1, and/or may include some or all of the components of the IHS 100, and in specific examples may be provided by aggregated switch devices and/or other networking devices known in the art. In the specific examples provided below, the aggregated networking devices are provided by VLT switch devices (called "VLT peer devices" below) that utilize the VLT protocol, which is a proprietary aggregation protocol provided in switch devices available from DELL® Inc. of Round Rock, Tex., United States, that configures the VLT peer devices to provide a redundant, load-balancing connection to a core network in a loop-free environment while eliminating the need to utilize the Spanning Tree Protocol. However, while illustrated and discussed as switch devices such as VLT peer devices, one of skill in the art in possession of the present disclosure will recognize that aggregated networking devices provided in the aggregated networking device policy-based routing system 200 may include any devices that may be configured to operate similarly as the aggregated networking devices 202 and 204 discussed below.

As would be understood by one of skill in the art in possession of the present disclosure, the aggregated networking devices 202 and 204 may be coupled together by one or more links. For example, in the illustrated embodiment, an Inter-Chassis Link (ICL) 206 is provided between the aggregated networking devices 202 and 204 and includes a plurality of links 206a, 206b, and up to 206c (e.g., provided by Ethernet cables connected to ports (not illustrated) on each of the aggregated networking devices 202 and 204) that have been aggregated in a Link Aggregation Group (LAG) in order to provide the ICL 206. Continuing with the example above in which the aggregated networking devices 204 and 206 are VLT peer devices, the ICL 206 may provide a VLT interconnect (VLTi) between the VLT peer devices. As will be appreciated by one of skill in the art in possession of the present disclosure, the aggregated networking devices 202 and 204 (e.g., VLT peer devices) and ICL 206 (e.g., VLTi) may provide an aggregated networking device domain 208 (e.g., a VLT domain.)

In the illustrated embodiment, the aggregated networking device policy-based routing system 200 also includes a Top Of Rack (TOR) networking device 210. In an embodiment, the TOR networking device 210 may be provided by the IHS 100 discussed above with reference to FIG. 1, and/or may include some or all of the components of the IHS 100, and in specific examples may be provided by TOR switch devices and/or other networking devices known in the art. However, while illustrated and discussed as a TOR switch device, one of skill in the art in possession of the present disclosure will recognize that TOR networking devices provided in the aggregated networking device policy-based routing system 200 may include any devices that may be configured to operate similarly as the TOR networking device 210 discussed below. In the illustrated example, the TOR networking device 210 is coupled to each of the aggregated networking devices 202 and 204 by a LAG 212 that includes a link 212a to the aggregated networking device 202 (e.g., provided by an Ethernet cable connected to ports (not illustrated) on each of the TOR networking device 210 and the aggregated networking device 202), and a link 212b to the aggregated networking device 204 (e.g., provided by an Ethernet cable connected to ports (not illustrated) on each of the TOR networking device 210 and the aggregated networking device 204). Continuing with the example above in which the aggregated networking devices 202 and 204 are VLT peer devices, the LAG 212 may provide a VLT port channel between the TOR networking device 210 and the VLT peer devices.

In the illustrated embodiment, the aggregated networking device policy-based routing system 200 also includes a core networking device 214. In an embodiment, the core networking device 214 may be provided by the IHS 100 discussed above with reference to FIG. 1, and/or may include some or all of the components of the IHS 100, and in specific examples may be provided by core switch devices and/or other networking devices known in the art. However, while illustrated and discussed as a core switch device, one of skill in the art in possession of the present disclosure will recognize that core networking devices provided in the aggregated networking device policy-based routing system 200 may include any devices that may be configured to operate similarly as the core networking device 214 discussed below. In the illustrated example, the core networking device 214 is coupled to each of the aggregated networking devices 202 and 204 by a LAG 215 that includes a link 215a to the aggregated networking device 202 (e.g., provided by an Ethernet cable connected to a port (not illustrated) on the core networking device 214 and a port 202a on the aggregated networking device 202), and a link 215b to the aggregated networking device 204 (e.g., provided by an Ethernet cable connected to ports (not illustrated) on each of the core networking device 214 and the aggregated networking device 204). Continuing with the example above in which the aggregated networking devices 202 and 204 are VLT peer devices, the LAG 215 may provide a VLT port channel between the core networking device 214 and the VLT peer devices.

In the illustrated embodiment, the aggregated networking device policy-based routing system 200 also includes a pair of host devices 216 and 218. In an embodiment, either or both of the host devices 216 and 218 may be provided by the IHS 100 discussed above with reference to FIG. 1, and/or may include some or all of the components of the IHS 100, and in specific examples may be provided by server computing devices, desktop computing devices, laptop/notebook computing devices, tablet computing devices, mobile phones, and/or other computing devices known in the art. However, while illustrated and discussed as being provided by particular computing devices, one of skill in the art in possession of the present disclosure will recognize that host devices provided in the aggregated networking device policy-based routing system 200 may include any devices that may be configured to operate similarly as the host devices 216 and 218 discussed below. In the illustrated example, the host device 216 is coupled to the TOR networking device 210 and, in a specific example, may be provided by a server computing device in a rack that includes a TOR switch device (i.e., provided by the TOR networking device 210.) In the illustrated embodiment, the host device 218 is coupled to the core networking device 214 via a network 220 that may be provided by a Local Area Network (LAN), the Internet, combinations thereof, and/or any other network that would be apparent to one of skill in the art in possession of the present disclosure, and in specific examples may be provided by any computing device that communicates with the host device 216 via the network 220.

In the illustrated embodiment, the aggregated networking device policy-based routing system 200 also includes a core networking device 222. In an embodiment, the core networking device 222 may be provided by the IHS 100 discussed above with reference to FIG. 1, and/or may include some or all of the components of the IHS 100, and in specific examples may be provided by core switch devices and/or other networking devices known in the art. However, while illustrated and discussed as a core switch device, one of skill in the art in possession of the present disclosure will recognize that core networking devices provided in the aggregated networking device policy-based routing system 200 may include any devices that may be configured to operate similarly as the core networking device 222 discussed below. In the illustrated example, the core networking device 222 is coupled to the aggregated networking device 202 by a link 224 to the aggregated networking device 202 (e.g., provided by an Ethernet cable connected to a port (not illustrated) on the core networking device 222 and a port 202b on the aggregated networking device 202). As illustrated in FIG. 2, the core networking device 222 is also coupled to the host device 218 via the network 220. However, while a specific aggregated networking device policy-based routing system 200 has been illustrated and described, one of skill in the art in possession of the present disclosure will recognize that the aggregated networking device policy based routing system of the present disclosure may include a variety of components and component configurations while remaining within the scope of the present disclosure as well.

Figure 3:
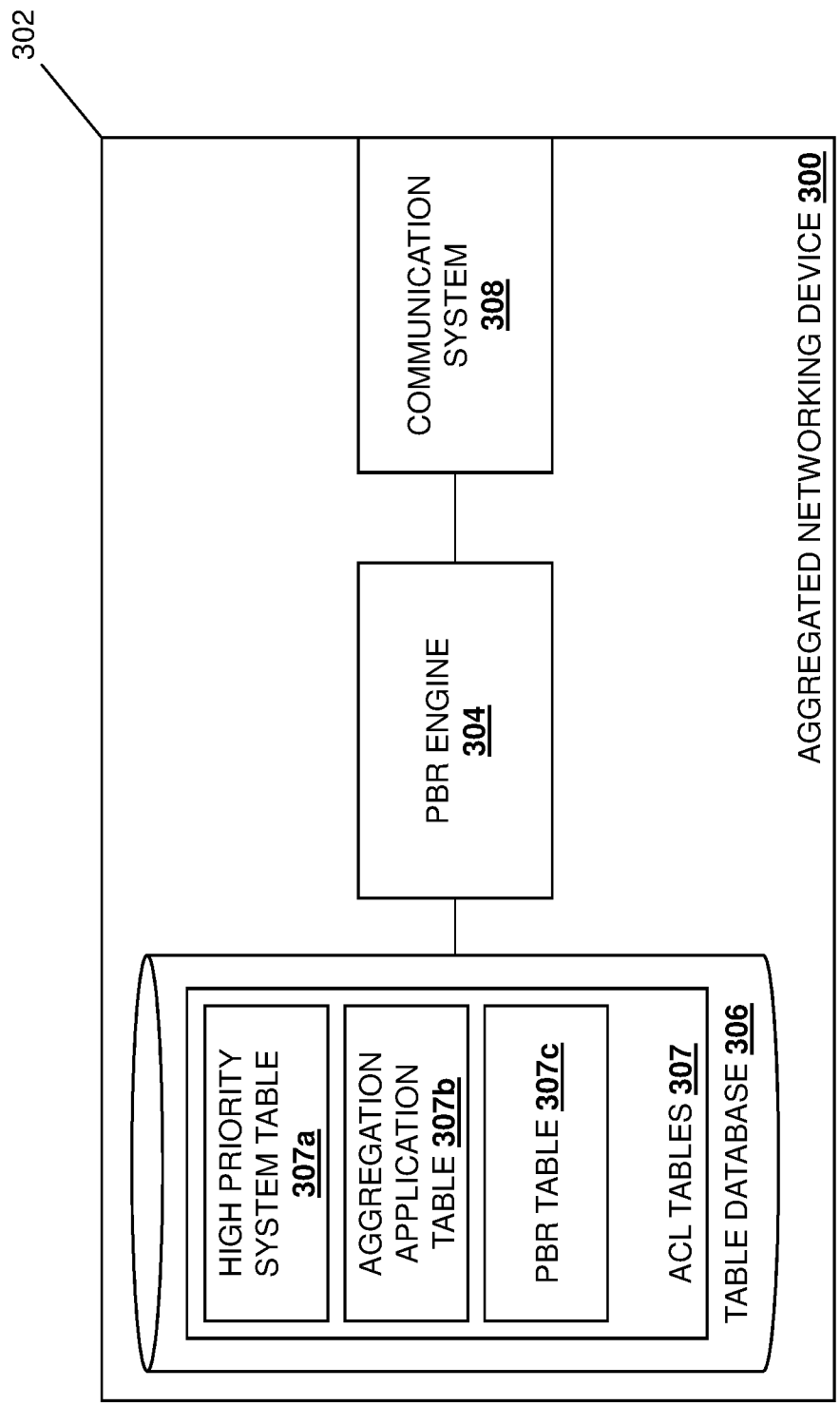
FIG. 3 is a schematic view illustrating an embodiment of an aggregated networking device that may be provided in the aggregated networking device policy-based routing system of FIG. 2.

Referring now to FIG. 3, an embodiment of an aggregated networking device 300 is illustrated that may provide either of the aggregated networking devices 202 and 204 discussed above with reference to FIG. 2. As such, the aggregated networking device 300 may be provided by the IHS 100 discussed above with reference to FIG. 1 and/or may include some or all of the components of the IHS 100, and in specific examples may be provided by aggregated switch devices and/or other networking devices known in the art. Thus, in the specific examples provided below, the aggregated networking device 300 is provided by a VLT switch device (called a "VLT peer device" below) that utilizes the proprietary VLT aggregation protocol discussed above. Furthermore, while illustrated and discussed as an aggregated switch device such as a VLT peer device, one of skill in the art in possession of the present disclosure will recognize that the functionality of the aggregated networking device 300 discussed below may be provided by other devices that are configured to operate similarly as the aggregated networking device 300 discussed below.

In the illustrated embodiment, the aggregated networking device 300 includes a chassis 302 that houses the components of the aggregated networking device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a Policy Based Routing (PBR) engine 304 that is configured to perform the functionality of the PBR engines and/or aggregated networking devices discussed below.

The chassis 302 may also house a storage system (not illustrated, but which may include the storage 108 discussed above with reference to FIG. 1) that is coupled to the PBR engine 304 (e.g., via a coupling between the storage system and the processing system) and that includes a table database 306 that is configured to store any of the information utilized by the PBR engine 304 discussed below. For example, the embodiment of FIG. 3 provides the table database 306 storing Access Control List (ACL) tables 307 that include a high priority system table 307a, an aggregation application table 307b (e.g., a VLT application table), and a PBR table 307c. However, while specific tables are illustrated and described below as being provided in the table database 306, one of skill in the art in possession of the present disclosure will appreciate that a variety of different information may be stored in a variety of forms, and may be utilized by the PBR engine 304 to provide the functionality discussed below while remaining within the scope of the present disclosure as well.

The chassis 302 may also house a communication system 308 that is coupled to the PBR engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, the communication system 308 may include any of the ports discussed herein such as, for example, the ports 202a and 202b on the aggregated networking device 200. However, while a specific aggregated networking device 300 has been illustrated, one of skill in the art in possession of the present disclosure will recognize that aggregated networking devices (or other devices operating according to the teachings of the present disclosure in a manner similar to that described below for the aggregated networking device 300) may include a variety of components and/or component configurations for providing conventional aggregated networking device functionality, as well as the functionality discussed below, while remaining within the scope of the present disclosure as well.

Figure 4:
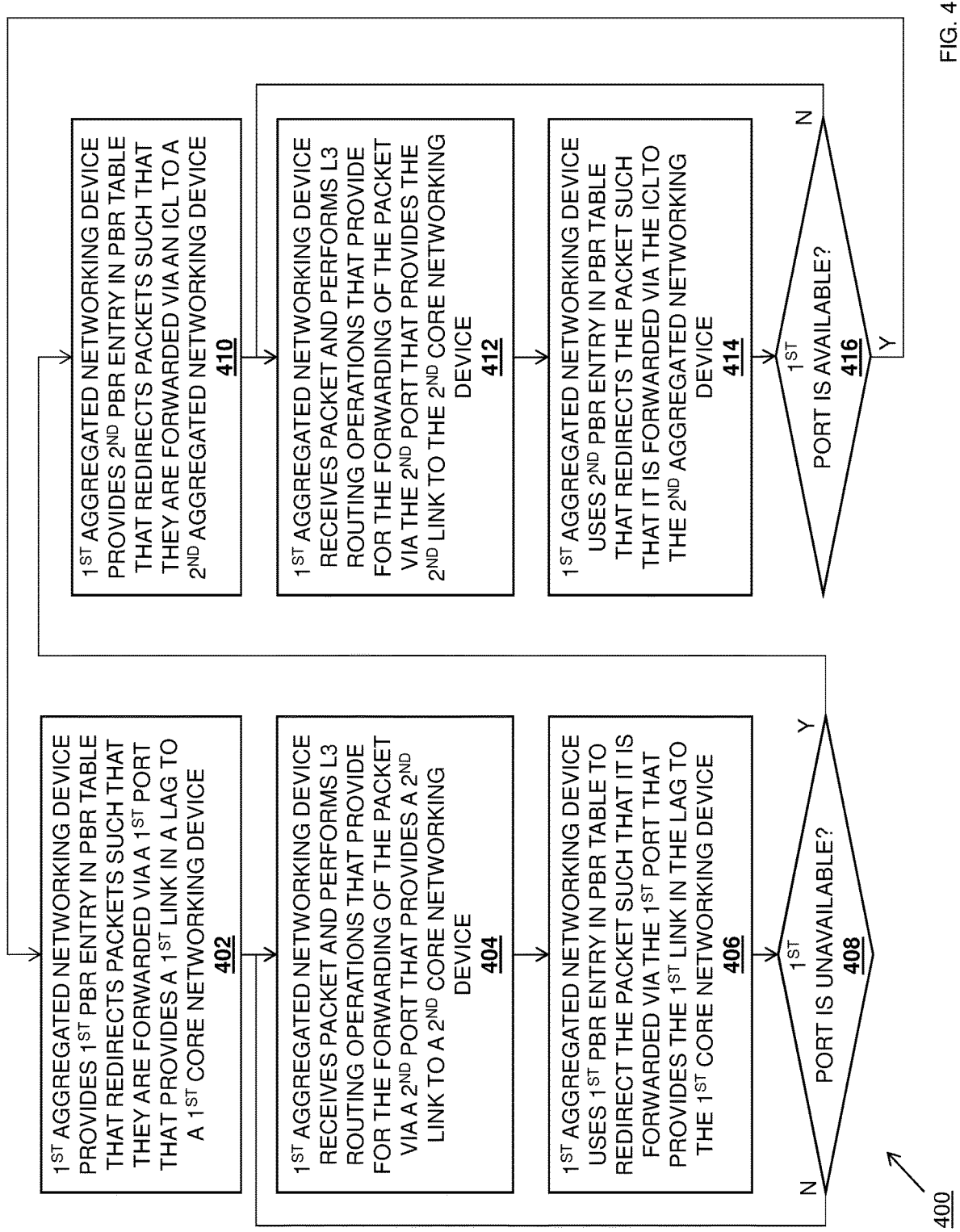
FIG. 4 is a flow chart illustrating an embodiment of a method for providing policy-based routing for an aggregated networking device.

Referring now to FIG. 4, an embodiment of a method 400 for providing policy-based routing for an aggregated networking device is illustrated. As discussed below, the systems and methods of the present disclosure provide for the use of a "secondary" or "backup" PBR entry in the event a "primary" PBR entry redirects packets to a port that provides a link in a LAG and that becomes unavailable, with that a "secondary" or "backup" PBR entry redirecting those packets over an ICL so that those packets may be transmitted over that LAG. For example, a first aggregated networking device and a second aggregated networking device may be coupled together by the ICL, and coupled to a first core networking device by the LAG. The first aggregated networking device includes a first port that provides a first link in the LAG to the first core networking device, and a second port that provides a second link to a second core networking device. The first aggregated networking device provides the "primary" PBR entry in its PBR table that redirects packets that are initially provided for forwarding via the second port to the second core networking device such that those packets are forwarded via the first port to the first core networking device. In the event the first aggregated networking device detects that the first port is unavailable, it provides the "secondary" or "backup" PBR entry in its PBR table that redirects the packets that are initially provided for forwarding via the second port to the second core networking device such that those packets are forwarded via the ICL to the second aggregated networking device for transmission via the first LAG to the first core networking device. As such, policy based routing may be provided with aggregated networking devices to ensure the forwarding of packets using a LAG provided by the aggregated networking devices, while also ensuring the forwarding of those packets using the LAG provided by the aggregated networking devices in the event the policy based routing redirects the packets to a port that provide a link in the LAG and that become unavailable, which is a situation where conventional PBR and aggregated networking device operation would otherwise drop those packets, as discussed above.

Figure 5A:
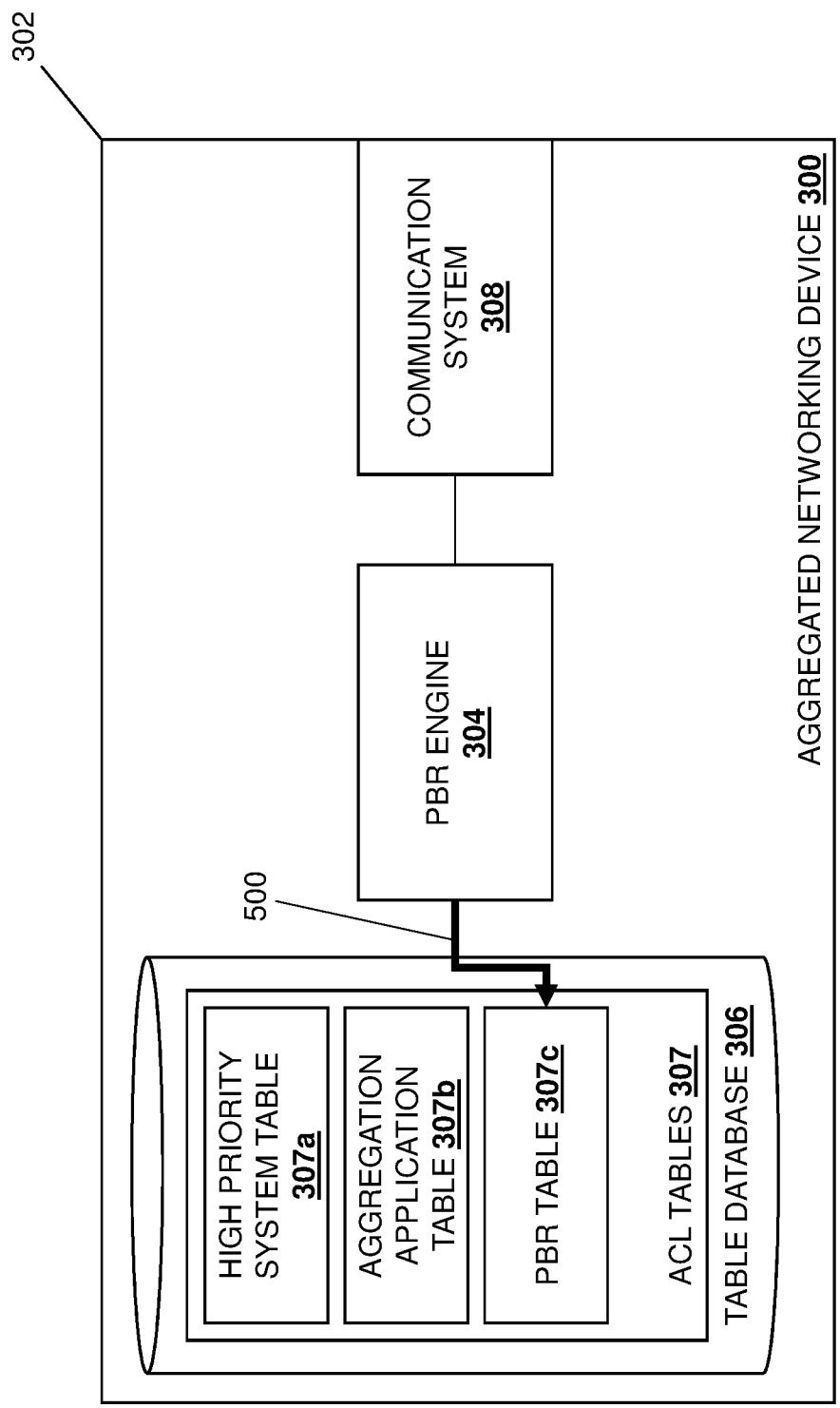
FIG. 5A is a schematic view illustrating an embodiment of the aggregated networking device of FIG. 3 operating during the method of FIG. 4.

The method 400 begins at block 402 where a first aggregated networking device provides a first PBR entry in a PBR table that redirects packets such that they are forwarded via a first port that provides a first link in a LAG to a first core networking device. As illustrated in FIG. 5A, in an embodiment of block 402, the PBR engine 304 in the aggregated networking device 202/300 may perform PBR entry operations 500 to provide a first PBR entry in the PBR table 307c included in the ACL tables 307 stored in the table database 306. As will be appreciated by one of skill in the art in possession of the present disclosure, PBR entries may be provided in the PBR table included in a networking device in order make routing decisions based on policies provided by the PBR entry, and may be utilized to override conventional L3 routing behavior caused by conventional L3 routing techniques. In some embodiments, the configuration of the aggregated networking device policy-based routing system 200 may introduce situations in which conventional L3 routing techniques provide for the forwarding of packets received at the aggregated networking device 202 in a manner that does not utilize the LAG 215 (e.g., a VLT port channel) and thus does not take advantage of the benefits provided by the aggregated networking device domain 208 (e.g., a VLT domain.)

Figure 5B:
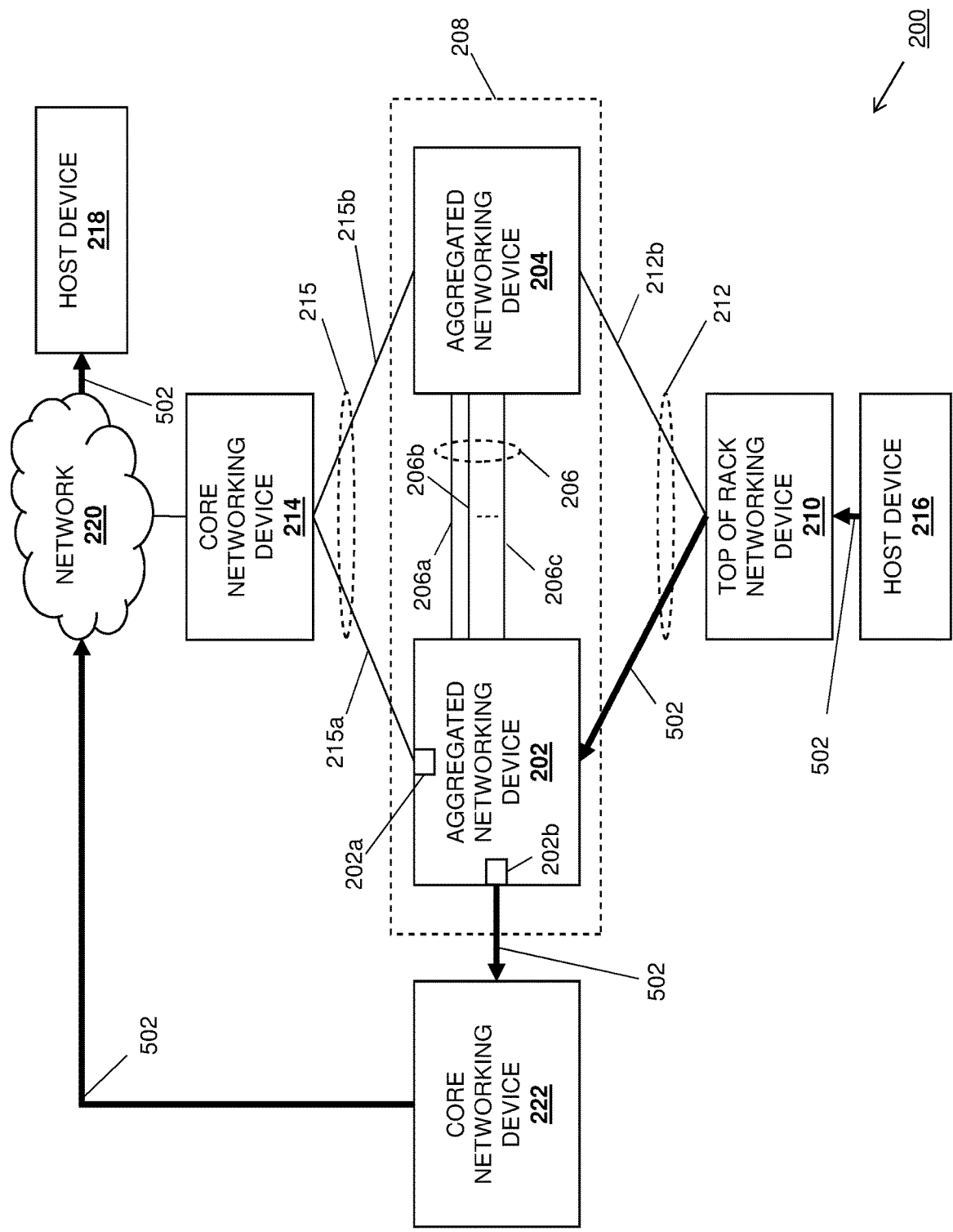
FIG. 5B is a schematic view illustrating an embodiment of the aggregated networking device policy-based routing system of FIG. 2 operating during the method of FIG. 4.

For example, FIG. 5B illustrates how a packet 502 may be generated by the host device 216 and transmitted to the TOR networking device 210, and how the TOR networking device 210 may forward that packet 502 to the aggregated networking device 202 via the link 212a in the LAG 212. The aggregate networking device 202 may then perform conventional L3 routing techniques (e.g., based on the packet being destined for the host device 218) to select the port 202b on the aggregated networking device 202 as an egress port for forwarding the packet 502 via the link 224 to the core networking device 222, with the core networking device 222 forwarding the packet 502 via the network 220 to the host device 218. One of skill in the art in possession of the present disclosure will appreciate that the forwarding of the packet 502 via the core networking device 222 to the host device 218 does not utilize the LAG 215, and thus does not take advantage of the benefits provided by the aggregated networking device domain 208.

As such, the first PBR entry provided in the PBR table 307c via the PBR entry operations 500 performed by the PBR engine 304 in the aggregated networking device 202/300 may provide for the redirection of packets directed to the host device 218 and provided for forwarding over the port 202b (e.g., via the conventional L3 routing techniques discussed above) such that those packets are provided for forwarding over the port 202a. As such, the first PBR entry provided in the PBR table 307c allows packets that would otherwise be forwarded via the core networking device 222 to the host device 218 to take advantage of the benefits provided by the aggregated networking device domain 208 by redirecting those packets such that they are forwarded via the link 215a in the LAG 215 to the core networking device 214, which may then forward those packets over the network 220 to the host device 218.

As will be appreciated by one of skill in the art in possession of the present disclosure, in some embodiments the first PBR entry provided in the PBR table 307c may be generated on a management system (not illustrated) by a network administrator or other user of the aggregated networking device policy-based routing system 200, and provided by the management system to the PBR engine 304 in the aggregated networking device 202/300 (e.g., via a network and the communication system 308, via a direct connection, etc.) for provisioning in the PBR table 307c. However, in other embodiments, the PBR engine 304 in the aggregated networking device 202/300 may automatically generate the first PBR entry and provide it in the PBR table 307c. For example, in response to determining that packets directed to the host device 218 have been provided for forwarding over the port 202b, the PBR engine 304 in the aggregated networking device 202/300 may automatically generate the first PBR entry that redirects those packets such that they are provided for forwarding over the port 202a, and provide that first PBR entry in the PBR table. However, while a few specific examples of the provisioning of PBR entries in a PBR table have been described, one of skill in the art in possession of the present disclosure will appreciate that the PBR entries of the present disclosure may be provided in a variety of manners that will fall within the scope of the present disclosure as well.

Figure 5C:
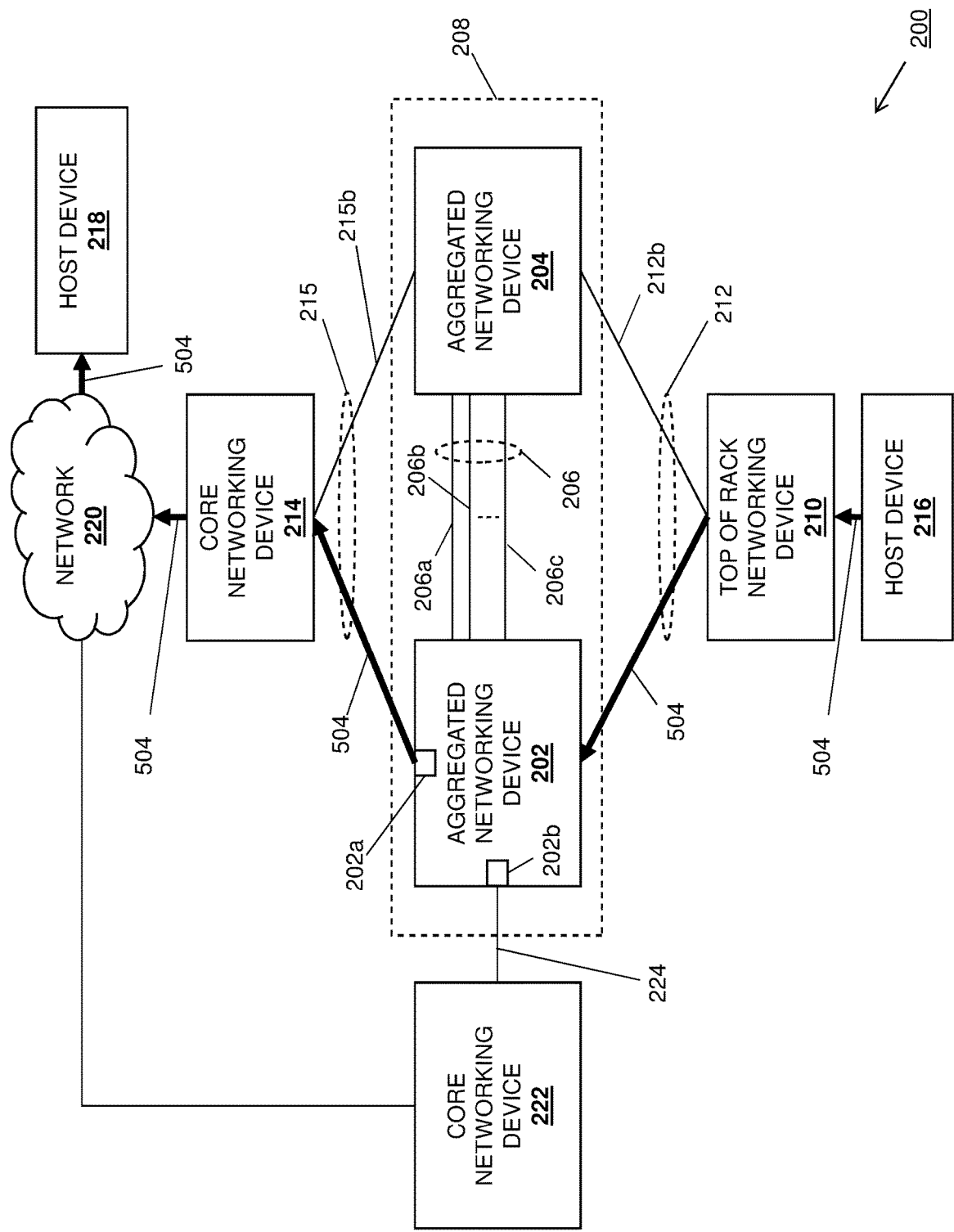
FIG. 5C is a schematic view illustrating an embodiment of the aggregated networking device policy-based routing system of FIG. 2 operating during the method of FIG. 4.

The method 400 then proceeds to block 404 where the first aggregated networking device receives a packet and performs L3 routing operations that provide for the forwarding of the packet via a second port that provides a second link to a second core networking device. With reference to FIG. 5C, in an embodiment of block 404 and subsequent to the first PBR entry being provided in the PBR table 307c, a packet 504 may be generated by the host device 216 and transmitted to the TOR networking device 210, and the TOR networking device 210 may forward that packet 504 to the aggregated networking device 202 via the link 212a in the LAG 212. The aggregate networking device 202 may then perform conventional L3 routing techniques (e.g., based on the packet being destined for the host device 218) to select the port 202b on the aggregated networking device 202 as an egress port for forwarding the packet 504 via the link 224 to the core networking device 222.

The method 400 then proceeds to block 406 where the first aggregated networking device uses the first PBR entry in the PBR table to redirect the packet such that it is forwarded via the first port that provides the first link in the LAG to the first core networking device. With reference to FIG. 5C, in an embodiment of block 406 and following the conventional L3 routing techniques performed by the first aggregated networking device 202 to select the port 202b as an egress port for forwarding the packet 504, the PBR engine 304 in the aggregated networking device 202/300 may utilize the first PBR entry provided in the PBR table 307a at block 402 to redirect the packet 504 such that the packet 504 is forwarded through the port 202a and via the link 215a in the LAG 215 to the core networking device 214, with the core networking device 214 forwarding the packet to the host device 218 via the network 220. For example, the first PBR entry in the PBR table 307a may be utilized by the PBR engine 304 in the aggregated networking device 202/300 to replace the port 202b (which has been selected as the egress port for the packet 504 using conventional L3 routing techniques) with the port 202a as part of the process of forwarding the packet 504.

The method 400 then proceeds to decision block 408 where it is determined whether the first port is unavailable. In an embodiment, at decision block 406, the PBR engine 304 in the aggregated networking device 202/300 may operate to monitor the port 202a in order to determine the availability of the port 202a. As will be appreciated by one of skill in the art in possession of the present disclosure, the monitoring of the port 202a by the PBR engine 304 in the aggregated networking device 202/300 may include the use of any of a variety of port availability monitoring techniques known in the art. If, at decision block 406, it is determined that the first port is available, the method 400 returns to block 404. As such, the method 400 may loop to receive packets from the host device 216 that are directed to the host device 218, perform conventional L3 routing techniques to select the port 202b on the aggregated networking device 202 as an egress port for forwarding the packets via the link 224 to the core networking device 222, and then utilize the first PBR entry provided in the PBR table 307a to redirect the packets such that the packets are forwarded through the port 202a and via the link 215a in the LAG 215 to the core networking device 214 (with the core networking device 214 forwarding the packets to the host device 218 via the network 220) as long as the port 202a is available. Thus, the first PBR entry ensures that packets transmitted by the host device 216 to the host device 218 will utilize the benefits provided by the aggregated networking device domain 208.

Figure 5D:
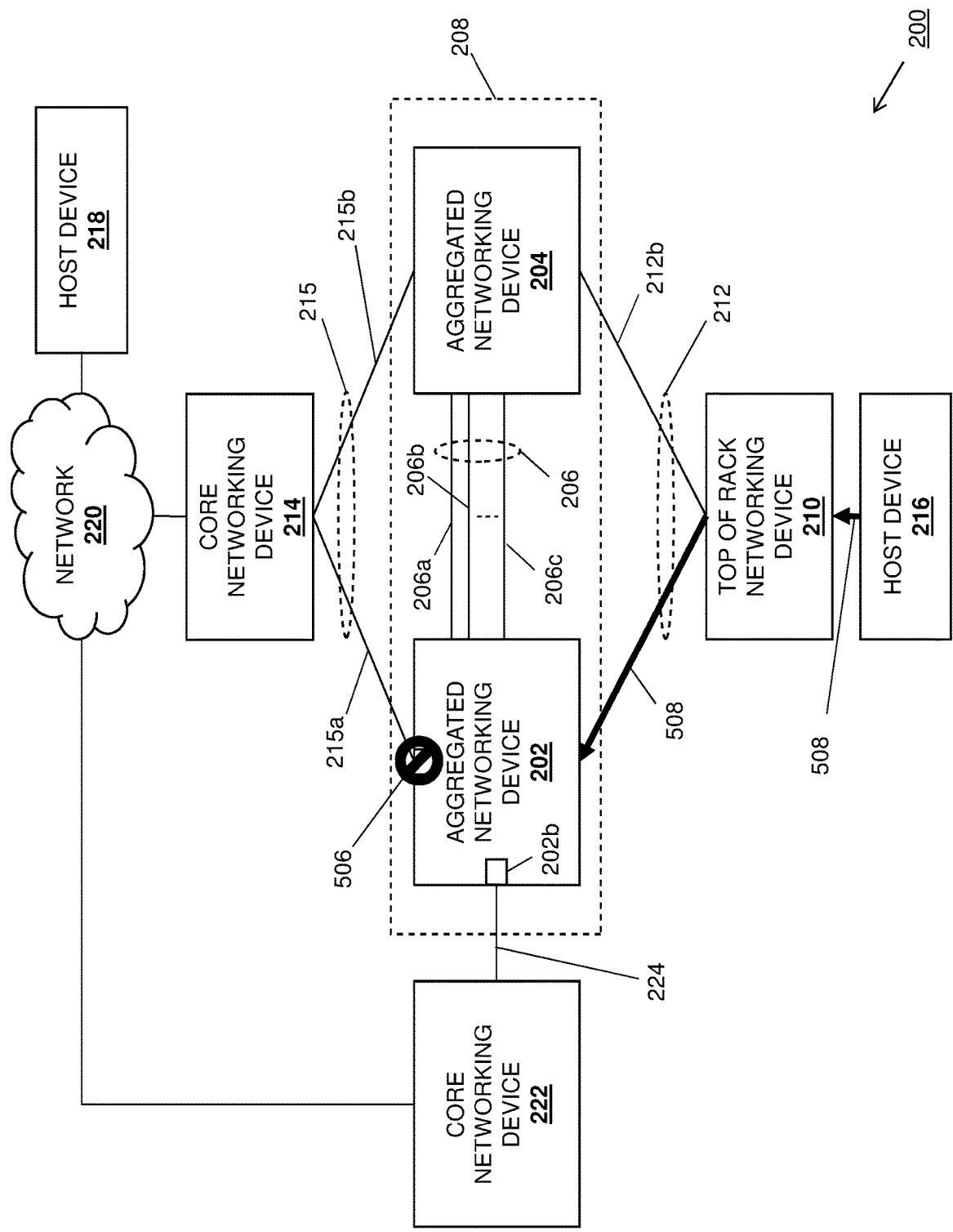
FIG. 5D is a schematic view illustrating an embodiment of the aggregated networking device policy-based routing system of FIG. 2 operating during the method of FIG. 4.

If at decision block 406, it is determined that the first port is unavailable, the method 400 proceeds to block 410 where the first aggregated networking device provides a second PBR entry in the PBR table that redirects packets such that they are forwarded via an ICL to a second aggregated networking device. As illustrated in FIG. 5D, in some embodiments of decision block 406, the port 202a may be become unavailable for the transmission of packets for any of a variety of unavailable port reasons that would be apparent to one of skill in the art in possession of the present disclosure. As such, at decision block 406, the monitoring of the port 202a by the PBR engine 304 in the aggregated networking device 202/300 may result in the PBR engine 304 determining that the port 202a has become unavailable, as illustrated by element 506 in FIG. 5D. As discussed above, the unavailability of the port 202a in the situation described above may result in the dropping of packets. For example, with reference to FIG. 5D, in an embodiment of block 406 and subsequent to the first PBR entry being provided in the PBR table 307c, a packet 508 may be generated by the host device 216 and transmitted to the TOR networking device 210, and the TOR networking device 210 may forward that packet 508 to the aggregated networking device 202 via the link 212a in the LAG 212. As discussed above, the aggregate networking device 202 may then perform conventional L3 routing techniques (e.g., based on the packet being destined for the host device 218) to select the port 202b on the aggregated networking device 202 as an egress port for forwarding the packet 504 via the link 224 to the core networking device 222.

As discussed above, conventional aggregated networking devices such as VLT peer devices may be configured to address unavailable egress port/link situations. For example, the aggregated networking device 202/300 (e.g., a first VLT peer device) includes the aggregation application table 307b (e.g., VLT application tables) in the ACL tables 307 stored in the table database 306, and that aggregation application table 307b may include aggregation application entries that provide for the forwarding of packets directed to an unavailable egress port on the aggregated networking device 202 over the ICL 206 (e.g., a VLTi) to the aggregated networking device 204 (e.g., a second VLT peer device), which allows that aggregated networking device 204 to utilize its available link 215b in the LAG 215 (e.g., a VLT port channel) to forward the packets via the core networking device 214 to the host device 218. Thus, in the event of the unavailability of the port 202a, the receiving of packets directed to the port 202a on the aggregated networking device 202 would cause the aggregation application entries in the aggregation application table 307b to be utilized to forward those packets via the ICL 206 to the aggregated networking device 204 such that the aggregated networking device 204 may forward those packets via the link 215b in the LAG 215 to the core networking device 214 for forwarding to the host device 218 via the network 220.

However, in the situation described above where the first PBR entry is utilized to redirect packets from the port 202b to the port 202a, the aggregation application entries in the aggregation application table 307b will not be utilized to forward those packets via the ICL 206 to the aggregated networking device 204. Rather, as discussed above, the chipset architecture in the processing system of the aggregated networking device 202/300 may provide for the accessing of the aggregation application table 307b (e.g., a VLT application table) and the PBR table 307c at substantially the same time. As will be appreciated by one of skill in the art in possession of the present disclosure, the simultaneous access of the aggregation application table 307b and the PBR table 307c will prevent the aggregation application entries discussed above in the aggregation application table 307b from being utilized, as the packets are directed to the port 202b due to the conventional L3 routing operations (rather than the port 202a that would cause those aggregation application entries to be utilized when the port 202a is unavailable), and will result in the utilization of the first PBR entry in the PBR table 307b to redirect the packets from the port 202b to the port 202a as discussed above, which can result in the packets being dropped due to the unavailability of the port 202a.

However, the systems and methods of the present disclosure operate to avoid the dropping of packets in situations like those described above by providing a second PBR entry in the PBR table that redirects packets such that they are forwarded via an ICL to a second aggregated networking device at block 410. As illustrated in FIG. 5E, at block 410, the PBR engine 304 in the aggregated networking device 202/300 may perform PBR entry operations 510 to provide a second PBR entry in the PBR table 307c included in the ACL tables 307 stored in the table database 306. As will be appreciated by one of skill in the art in possession of the present disclosure, the provisioning of the second PBR entry in the PBR table 307c may include the PBR engine 304 in the aggregated networking device 202/300 removing the first PBR entry from the PBR table 307c and providing the second PBR entry in the PBR table 307c, modifying the first PBR entry in the PBR table 307c such that it becomes the second PBR entry in the PBR table 307c, and/or any other PBR entry provisioning operations that would enable the second PBR entry functionality discussed below.

The second PBR entry provided in the PBR table 307c via the PBR entry operations 510 performed by the PBR engine 304 in the aggregated networking device 202/300 may provide for the redirection of packets destined for the host device 218 and provided for forwarding over the port 202b (e.g., via the conventional L3 routing techniques discussed above) such that those packets are provided for forwarding over the ICL 206. As such, the second PBR entry provided in the PBR table 307c allows packets that would otherwise be forwarded via the core networking device 222 to the host device 218 to take advantage of the benefits provided by the aggregated networking device domain 208 while avoiding the unavailable port 202a by redirecting those packets for forwarded via one of the links 206a-206c in the ICL 206 to the second aggregated networking device 204 such that the second aggregated networking device 204 may forward those packets over the available link 215b in the LAG 215 to the core networking device 214, which may then forward those packets over the network 220 to the host device 218.

As will be appreciated by one of skill in the art in possession of the present disclosure, in some embodiments the second PBR entry provided in the PBR table 307c may be generated on a management system (not illustrated) by a network administrator or other user of the aggregated networking device policy based routing system 200, and provided by the management system to the PBR engine 304 in the aggregated networking device 202/300 (e.g., via a network and the communication system 308, via a direct connection, etc.) for provisioning in the PBR table 307c when the port 202a becomes unavailable. However, in other embodiments, the PBR engine 304 in the aggregated networking device 202/300 may automatically generate the second PBR entry and provide it in the PBR table 307c. For example, in response to determining that the port 202a is unavailable, the PBR engine 304 in the aggregated networking device 202/300 may automatically generate the second PBR entry that redirects those packets such that they are provided for forwarding over the ICL 206, and provide that second PBR entry in the PBR table 307c. However, while a few specific examples of the provisioning of the "secondary" or "backup" PBR entries of the present disclosure in a PBR table have been described, one of skill in the art in possession of the present disclosure will appreciate that the "secondary" or "backup" PBR entries of the present disclosure may be provided in a variety of manners that will fall within the scope of the present disclosure as well.

Figure 5F:
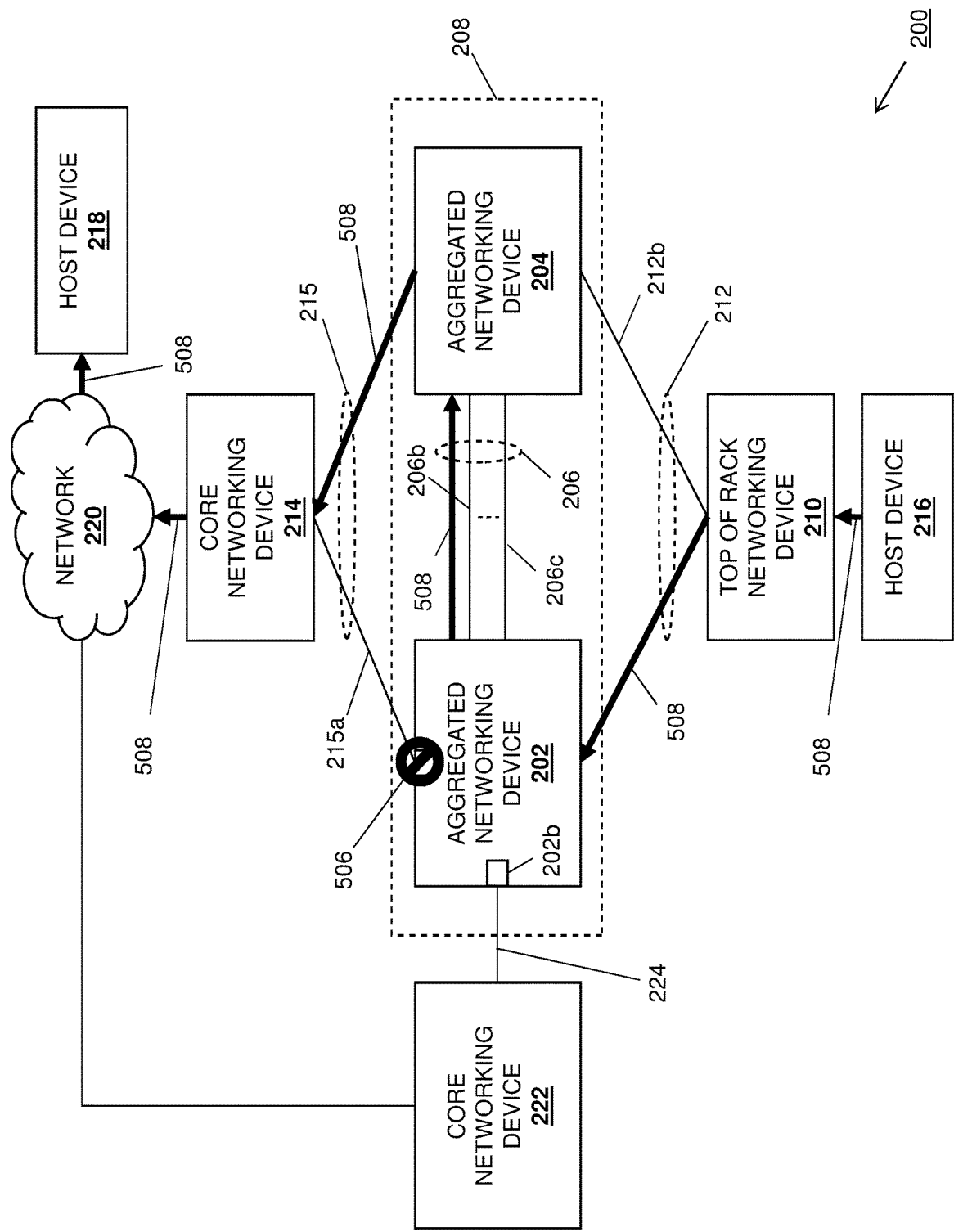
FIG. 5F is a schematic view illustrating an embodiment of the aggregated networking device policy-based routing system of FIG. 2 operating during the method of FIG. 4.

The method 400 then proceeds to block 412 where the first aggregated networking device receives a packet and performs L3 routing operations that provide for the forwarding of the packet via the second port that provides the second link to the second core networking device. With reference to FIG. 5F, in an embodiment of block 412 and subsequent to the second PBR entry being provided in the PBR table 307c, the packet 508 generated by the host device 216, transmitted to the TOR networking device 210, and forwarded by the TOR networking device 210 to the aggregated networking device 202 via the link 212a in the LAG 212 may be received by the PBR engine 304 in the aggregated networking device 202/300. The aggregate networking device 202 may then perform conventional L3 routing techniques (e.g., based on the packet being destined for the host device 218) to select the port 202b on the aggregated networking device 202 as an egress port for forwarding the packet 504 via the link 224 to the core networking device 222

The method 400 then proceeds to block 414 where the first aggregated networking device uses the second PBR entry in the PBR table to redirect the packet such that it is forwarded via the ICL to the second aggregated networking device. In an embodiment, at block 414 and following the conventional L3 routing techniques performed by the first aggregated networking device 202 to select the port 202b as an egress port for forwarding the packet 504, the PBR engine 304 in the aggregated networking device 202/300 may utilize the second PBR entry provided in the PBR table 307a at block 210 to redirect the packet 508 such that the packet 508 is forwarded over a link in the ICL 206 (e.g., the link 206a in the illustrated embodiment) to the aggregated networking device 204, and forwarded by the aggregated networking device 204 via the link 215a in the LAG 215 to the core networking device 214, with the core networking device 214 forwarding the packet 508 to the host device 218 via the network 220. For example, the second PBR entry in the PBR table 307a may be utilized by the PBR engine 304 in the aggregated networking device 202/300 to replace the port 202b (which has been selected as the egress port for the packet 504 using conventional L3 routing techniques) with a port that provides the link 206a in the LAG 206 as part of the process of forwarding the packet 508.

The method 400 then proceeds to decision block 416 where it is determined whether the first port is available. In an embodiment, at decision block 416, the PBR engine 304 in the aggregated networking device 202/300 may operate to monitor the port 202a in order to determine the availability of the port 202a. As will be appreciated by one of skill in the art in possession of the present disclosure, the monitoring of the port 202a by the PBR engine 304 in the aggregated networking device 202/300 may include the use of any of a variety of port availability monitoring techniques known in the art. If, at decision block 416, it is determined that the first port is unavailable, the method 400 returns to block 412. As such, the method 400 may loop to receive packets from the host device 216 that are directed to the host device 218, perform conventional L3 routing techniques to select the port 202b on the aggregated networking device 202 as an egress port for forwarding the packets via the link 224 to the core networking device 222, and then utilize the second PBR entry provided in the PBR table 307a to redirect the packets such that the packets are forwarded over the ICL 206 to the second aggregated networking device 204, which forwards the packets via the link 215a in the LAG 215 to the core networking device 214 (with the core networking device 214 forwarding the packets to the host device 218 via the network 220) as long as the port 202a is unavailable. Thus, the second PBR entry ensures that packets transmitted by the host device 216 to the host device 218 will utilize the benefits provided by the aggregated networking device domain 208 while the port 202a that provides the link 215a in the LAG 215 is unavailable.

Figure 5G:
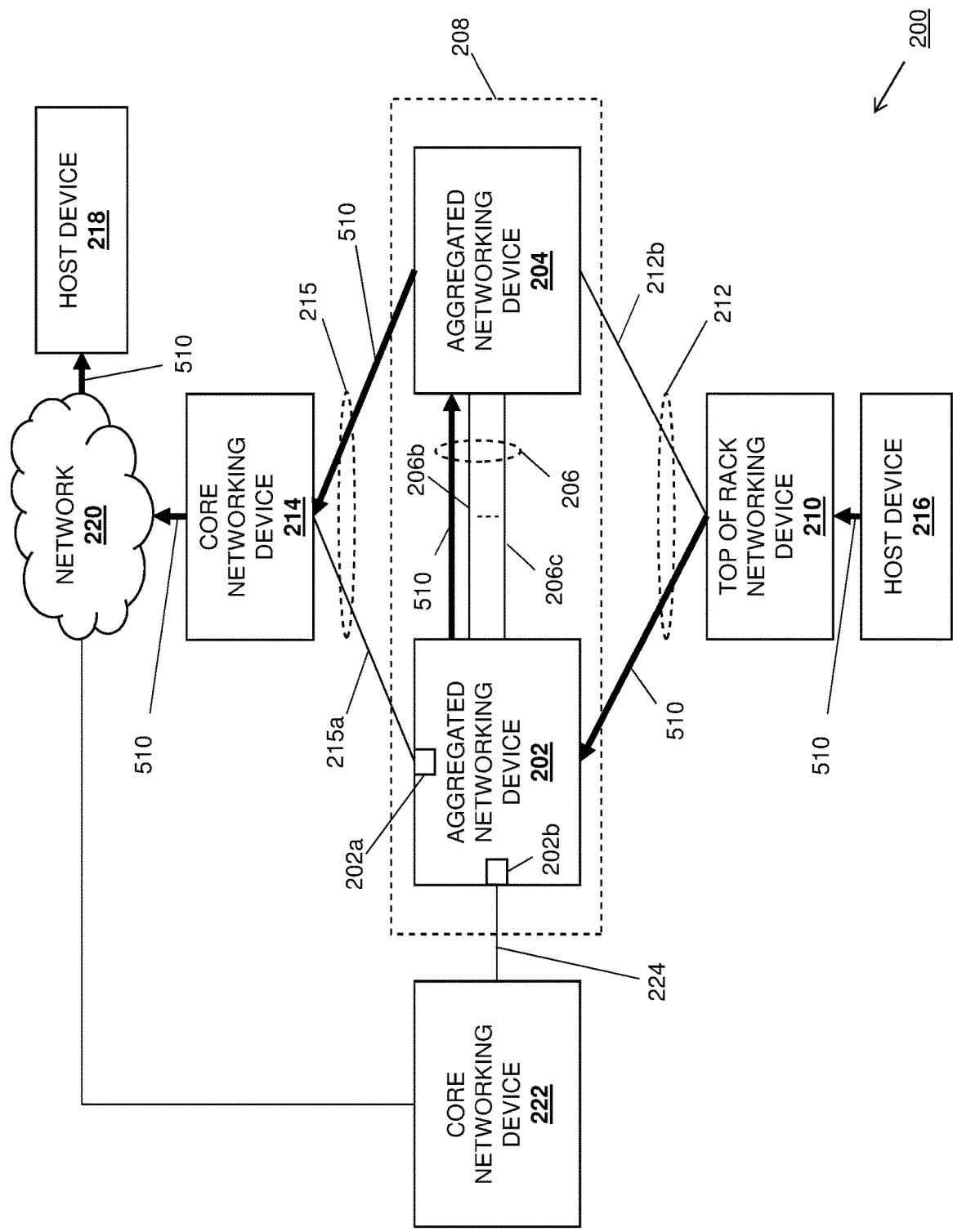
FIG. 5G is a schematic view illustrating an embodiment of the aggregated networking device policy-based routing system of FIG. 2 operating during the method of FIG. 4.
Figure 5H:
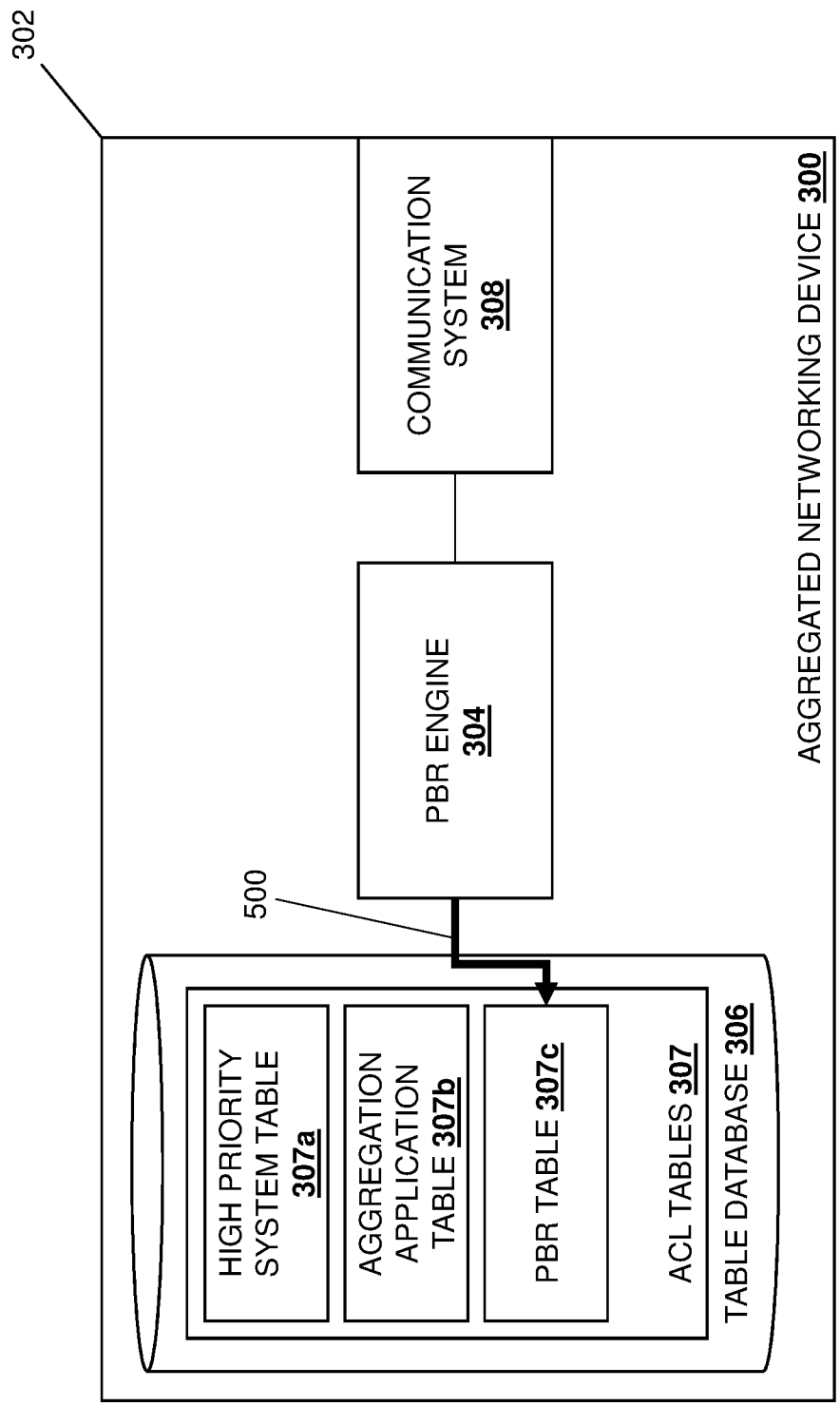
FIG. 5H is a schematic view illustrating an embodiment of the aggregated networking device of FIG. 3 operating during the method of FIG. 4.
Figure 5I:
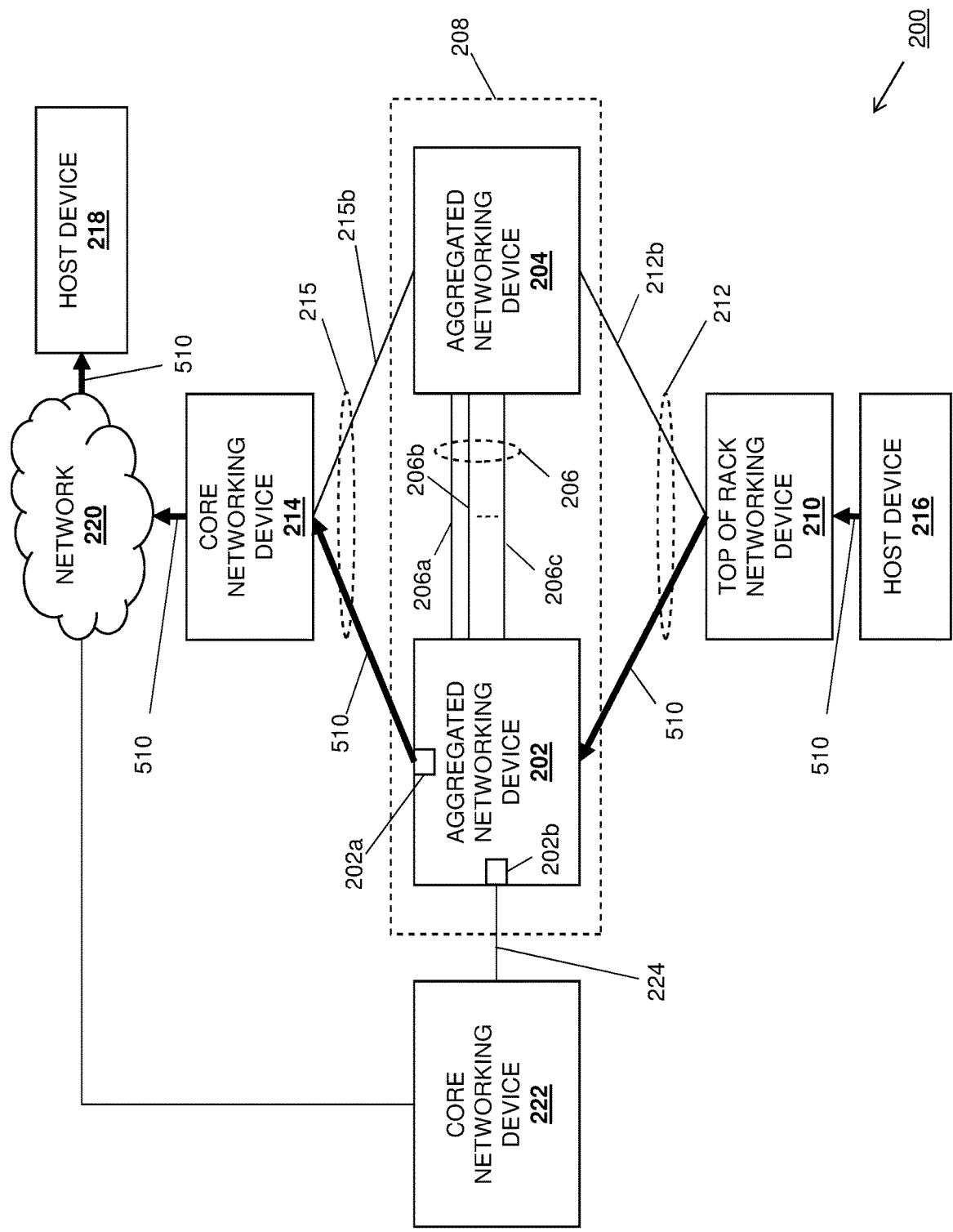
FIG. 5I is a schematic view illustrating an embodiment of the aggregated networking device policy-based routing system of FIG. 2 operating during the method of FIG. 4.

If, at decision block 416, it is determined that the first port is available, the method 400 returns to block 402. FIG. 5G illustrates how packets 510 may be transmitted according to the second PBR entry in the PBR table 307c in substantially the same manner as described above when the port 202a become available (as indicated by the removal of element 506 illustrated in FIGS. 5D and 5F), which may be detected by the PBR engine 304 in the aggregated networking device 202/300. As such, the method 400 may return to block 402, with the PBR engine 304 in the aggregated networking device 202/300 performing the PBR entry operations 500 discussed above to provide the first PBR entry in the PBR table 307c included in the ACL tables 307 stored in the table database 306, as illustrated in FIG. 5H, which causes the packets 510 to be transmitted according to the first PBR entry in the PBR table 307c in substantially the same manner as described above, as illustrated in FIG. 5I. As will be appreciated by one of skill in the art in possession of the present disclosure, the method 400 may then loop to transmit packets from the host device 216 to the host device 218 according to the first PBR entry when the port 202a is available, while transmitting packets from the host device 216 to the host device 218 according to the second PBR entry when the port 202a is unavailable.

Thus, systems and methods have been described that provide for the use of a "secondary" or "backup" PBR entry in the event a "primary" PBR entry redirects packets to a port that provides a link in a VLT port channel and that becomes unavailable, with that a "secondary" or "backup" PBR entry redirecting those packets over a VLTi so that those packets may be transmitted over that VLT port channel. For example, a first VLT peer device and a second VLT peer device may be coupled together by the VLTi, and coupled to a first core switch device by the VLT port channel. The first VLT peer device includes a first port that provides a first link in the VLT port channel to the first core switch device, and a second port that provides a second link to a second core switch device. The first VLT peer device provides the "primary" PBR entry in its PBR table that redirects packets that are initially provided for forwarding via the second port to the second core switch device such that those packets are forwarded via the first port to the first core switch device. In the event the first VLT peer device detects that the first port is unavailable, it provides the "secondary" or "backup" PBR entry in its PBR table that redirects the packets that are initially provided for forwarding via the second port to the second core switch device such that those packets are forwarded via the VLTi to the second VLT peer device for transmission via the VLT port channel to the first core switch device. As such, policy based routing may be provided with VLT peer devices to ensure the forwarding of packets using a VLT port channel provided by the VLT peer devices, while also ensuring the forwarding of those packets using the VLT port channel provided by the VLT peer devices in the event the policy based routing redirects the packets to a port that provides a link in the VLT port channel and that become unavailable, which is a situation where conventional PBR and VLT peer device operation would otherwise drop those packets as discussed above Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An aggregated networking device Policy Based Routing (PBR) system, comprising:
    a first core networking device;
    a second core networking device;
    a first aggregated networking device and a second aggregated networking device that are coupled together by a Inter-Chassis Link (ICL) and that are coupled to the first core networking device by a first Link Aggregation Group (LAG), wherein the first aggregated networking device includes a first port that provides a first link in the first LAG to the first core networking device, and a second port that provides a second link to the second core networking device, and wherein the first aggregated networking device is configured to:
        provide a first Policy Based Routing (PBR) entry in a PBR table in the first aggregated networking device that redirects packets that are initially provided for forwarding via the second port to the second core networking device such that those packets are forwarded via the first port to the first core networking device;
        detect that the first port is unavailable; and
        provide, in response to detecting that the first port is unavailable, a second PBR entry in the PBR table in the first aggregated networking device that redirects the packets that are initially provided for forwarding via the second port to the second core networking device such that those packets are forwarded via the ICL to the second aggregated networking device for transmission via the first LAG to the first core networking device.

2. The system of claim 1, wherein the first aggregated networking device is configured to:
    detect, subsequent to providing the second PBR entry in the PBR table in the first aggregated networking device, that the first port is available; and
    provide, in response to detecting that the first port is available, the first PBR entry in the PBR table in the first aggregated networking device that redirects the packets that are initially provided for forwarding via the second port to the second core networking device such that those packets are forwarded via the first port to the first core networking device.

3. The system of claim 1, wherein the first aggregated networking device is configured to:
    receive, prior to providing the first PBR entry in the PBR table in the first aggregated networking device, the packets; and
    perform Layer 3 (L3) routing operations that provide for the forwarding of the packets via the second port to the second core networking device.

4. The system of claim 1, further comprising:
    a Top Of Rack (TOR) networking device that is coupled to a host device and to the first aggregated networking device and the second aggregated networking device via a second LAG, wherein the packets are received by the first aggregated networking device from the host device via the second LAG and the TOR networking device.

5. The system of claim 1, wherein the first core networking device and the second core networking device are coupled to a host device via a network, and wherein the packets are directed to the host device.

6. The system of claim 1, wherein the first aggregated networking device is configured to:
    receive, from a management system, the first PBR entry.

7. An Information Handling System (IHS), comprising:
    a processing system; and
    a memory system that is coupled to the processing system and that includes instructions that, when executed by the processing system, cause the processing system to provide a Policy Based Routing (PBR) engine that is configured to:
        provide a first Policy Based Routing (PBR) entry in a PBR table that redirects packets that are initially provided for forwarding via a first port that provides a first link to a first core networking device such that those packets are forwarded via a second port that provides a second link that is included in a first Link Aggregation Group (LAG) to a second core networking device;

detect that the second port is unavailable; and provide, in response to detecting that the second port is unavailable, a second PBR entry in the PBR table that redirects the packets that are initially provided for forwarding via the first port that provides the first link to the first core networking device such that those packets are forwarded via an Inter-Chassis Link (ICL) to an aggregated networking device for transmission via the first LAG to the second core networking device.

8. The IHS of claim 7, wherein the PBR engine is configured to:

detect, subsequent to providing the second PBR entry in the PBR table, that the second port is available; and provide, in response to detecting that the second port is available, the first PBR entry in the PBR table that redirects the packets that are initially provided for forwarding via the first port that provides the first link to the first core networking device such that those packets are forwarded via the second port that provides the second link that is included in the first LAG to the second core networking device.

9. The IHS of claim 7, wherein the PBR engine is configured to:

receive, prior to providing the first PBR entry in the PBR table, the packets; and perform Layer 3 (L3) routing operations that provide for the forwarding of the packets via the first port that provides the first link to the first core networking device.

10. The IHS of claim 7, wherein the packets are received from a host device via a second LAG coupled to a TOR switch device.

11. The IHS of claim 7, wherein the first core networking device and the second core networking device are coupled to a host device via a network, and wherein the packets are directed to the host device.

12. The IHS of claim 7, wherein the PBR engine is configured to:

receive, from a management system, the first PBR entry.

13. The IHS of claim 7, wherein the PBR engine is configured to:

automatically generate, in response to the packets being provided for forwarding via the first port that provides the first link to the first core networking device, the first PBR entry.

14. A method for providing Policy Based Routing (PBR) for an aggregated networking device, comprising:

providing, by a first aggregated networking device, a first Policy Based Routing (PBR) entry in a PBR table in the first aggregated networking device that redirects packets that are initially provided for forwarding via a first port on the first aggregated networking device that provides a first link to a first core networking device such that those packets are forwarded via a second port on the first aggregated networking device that provides a second link that is included in a first Link Aggregation Group (LAG) to a second core networking device;

detecting, by the first aggregated networking device, that the second port is unavailable; and providing, by the first aggregated networking device in response to detecting that the second port is unavailable, a second PBR entry in the PBR table in the first aggregated networking device that redirects the packets that are initially provided for forwarding via the first port that provides the first link to the first core networking device such that those packets are forwarded via an Inter-Chassis Link (ICL) to a second aggregated networking device for transmission via the first LAG to the second core networking device.

15. The method of claim 14, further comprising:

detecting, by the first aggregated networking device subsequent to providing the second PBR entry in the PBR table in the first aggregated networking device, that the second port is available; and providing, by the first aggregated networking device in response to detecting that the second port is available, the first PBR entry in the PBR table in the first aggregated networking device that redirects the packets that are initially provided for forwarding via the first port that provides the first link to the first core networking device such that those packets are forwarded via the second port that provides the second link that is included in the first LAG to the second core networking device.

16. The method of claim 14, further comprising:

receiving, by the first aggregated networking device prior to providing the first PBR entry in the PBR table in the first aggregated networking device, the packets; and performing, by the first aggregated networking device, Layer 3 (L3) routing operations that provide for the forwarding of the packets via the first port that provides the first link to the first core networking device.

17. The method of claim 14, wherein the packets are received from a host device via a second LAG coupled to a TOR switch device.

18. The method of claim 14, wherein the first core networking device and the second core networking device are coupled to a host device via a network, and wherein the packets are directed to the host device.

19. The method of claim 14, further comprising:

receiving, by the first aggregated networking device from a management system, the first PBR entry.

20. The method of claim 14, further comprising:

automatically generating, by the first aggregated networking device in response to the packets being provided for forwarding via the first port that provides the first link to the first core networking device, the first PBR entry.

* * * * *